US008856760B2

(12) United States Patent
Heirich et al.

(10) Patent No.: US 8,856,760 B2
(45) Date of Patent: Oct. 7, 2014

(54) STREAMING PROGRAMMING GENERATOR

(75) Inventors: Alan B. Heirich, Half Moon Bay, CA (US); Benedict R. Gaster, Santa Cruz, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1016 days.

(21) Appl. No.: 12/911,952

(22) Filed: Oct. 26, 2010

(65) Prior Publication Data

US 2012/0102507 A1   Apr. 26, 2012

(51) Int. Cl.
*G06F 9/44* (2006.01)
(52) U.S. Cl.
CPC ........................................ *G06F 8/20* (2013.01)
USPC ............................ 717/140; 717/124; 717/135
(58) Field of Classification Search
CPC ............ G06F 11/3688; G06F 11/3664; G06F 11/3672; G06F 11/3684; G06F 11/362; G06F 11/3696; G06F 11/3636
USPC .......................................... 717/140, 124, 135
See application file for complete search history.

(56) References Cited

U.S. PATENT DOCUMENTS

| 8,402,229 | B1 * | 3/2013 | Wilt et al. ..................... 711/152 |
| 8,402,449 | B1 * | 3/2013 | Biswas et al. ................. 717/146 |
| 8,572,407 | B1 * | 10/2013 | Chengottarasappan et al. ............................. 713/190 |
| 2006/0064670 | A1 * | 3/2006 | Linebarger et al. ........... 717/106 |
| 2007/0091102 | A1 * | 4/2007 | Brothers et al. ............... 345/506 |
| 2008/0007559 | A1 * | 1/2008 | Kalaiah et al. ................ 345/501 |
| 2009/0307542 | A1 * | 12/2009 | Roohparvar ................... 714/704 |
| 2010/0149193 | A1 * | 6/2010 | Yu .................................. 345/505 |

OTHER PUBLICATIONS

Sugerman et al., "GRAMPS: A Programming Model for Graphics Pipelines", ACM Transactions on Graphics, vol. V, No. N, Month 20YY, 19 pages, available at http://graphics.stanford.edu/papers/gramps-tog/gramps-toq08.pdf.

* cited by examiner

*Primary Examiner* — Li B Zhen
*Assistant Examiner* — Arshia S Kia
(74) *Attorney, Agent, or Firm* — Harrity & Harrity, LLP

(57) ABSTRACT

A device receives input that includes definitions of components of a computational pipeline, where the components include one or more buffers, one or more kernels, and one or more stages within a control graph. The device generates, based on the input, kernel signatures for a graphics processor, where the kernel signatures compile into an executable streaming program for the computational pipeline. The device also generates, based on the input, host-side runtime code to execute the streaming program.

20 Claims, 6 Drawing Sheets

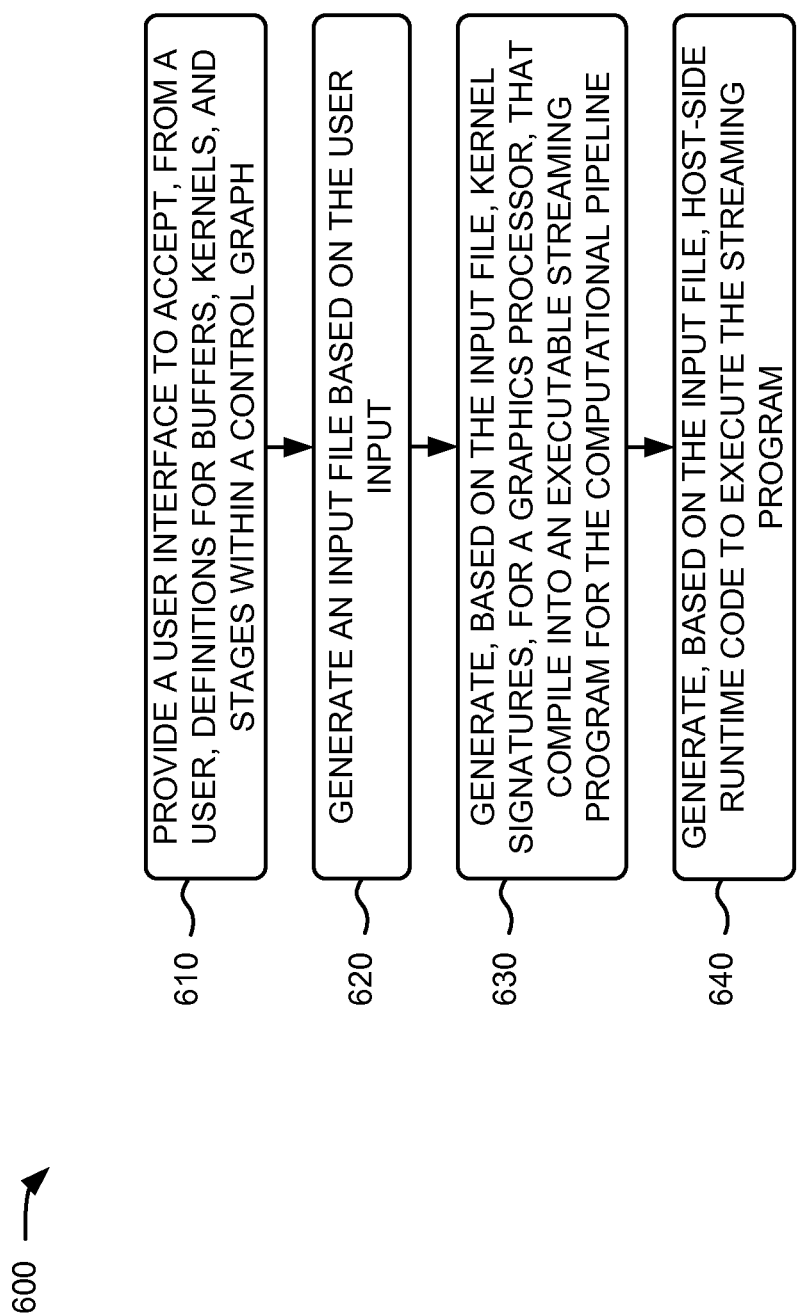

STREAMING PROGRAMMING GENERATOR

BACKGROUND

Graphics (or graphical) processing units (GPUs) have evolved from fixed-function pipelines used primarily for graphics acceleration to programmable parallel processing units that are suitable for general purpose computations. Improved GPU performance has made GPUs increasingly popular for general purpose computations on GPUs (referred to as "GPGPU"). GPGPU generally uses a GPU to perform computations in applications traditionally handled by a central processing unit (CPU). GPGPU is made possible by the addition of programmable stages and higher precision arithmetic to computational pipelines, allowing developers to use streaming programming languages on non-graphics data. Graphics processors include discrete GPUs (e.g., separate devices primarily dedicated to the processing of graphics), integrated GPUs (e.g., integrated into another device such as a north bridge), CPUs capable of processing graphics, accelerated or fused processing units (e.g., a GPU integrated into another processor such as a CPU), digital signal processors (DSPs), application processors, and the like.

Several GPU programming languages target GPGPU, such as OpenCL™ (from the Khronos Group), DirectCompute™ (from Microsoft Corporation), CUDA™ (from NVIDIA Corporation). These programming languages are typically based on the C programming language. These streaming programming languages describe computational kernels and data buffers but do not describe higher level constructs that result from their composition.

SUMMARY OF EMBODIMENTS OF THE INVENTION

According to one embodiment, a computing device-implemented method may include receiving, by the computing device, input that defines components of a computational pipeline, where the components include one or more buffers, one or more kernels, and one or more stages within a control graph. The method may further includes generating, by the computing device and based on the input, kernel signatures for a graphics processor, where the kernel signatures compile into an executable streaming program for the computational pipeline; and generating, by the computing device and based on the input, host-side runtime code to execute the streaming program.

According to one aspect, the input may include one or more application programming interface calls, or a text file supplied by a user.

According to another aspect, the method may further include providing a graphical user interface to accept, from the user, definitions for the one or more buffers, the one or more kernels, and the one or more stages within the control graph; and generating, based on the definitions, an input file.

According to still another aspect, the host-side runtime code may include a file of external pipeline stages and a unit test framework.

According to another embodiment, a device may include a memory, to store a plurality of instructions, and a processor. The processor may execute instructions in the memory to: receive, from a user, definitions of components of a computational pipeline, where the components include multiple buffers, multiple kernels, and multiple stages within a control graph; generate, based on the input file, kernel signatures for a graphics processor, where the kernel signatures compile into an executable streaming program for the computational pipeline; and generate, based on the definitions, host-side runtime code to execute the streaming program.

According to a further embodiment, a computer-readable memory device may store one or more computer-executable instructions, and may include one or more instructions to receive user input that includes definitions of components of a computational pipeline, where the components include one or more buffers, one or more kernels, and one or more stages within a control graph. The computer-readable memory device may also include one or more instructions to generate, based on the input file, kernel signatures for a graphics processor, where the kernel signatures compile into an executable streaming program for the computational pipeline; and one or more instructions to generate, based on the user input, host-side runtime code to execute the streaming program.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 6 is a flow chart of an example process for automatically generating a streaming program according to an embodiment described herein.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may provide a toolkit for developing computational pipelines in streaming programming languages, such as OpenCL and DirectCompute. In an embodiment described herein, computational pipelines may be described by a control graph with associated stages, buffers and kernels. The toolkit may automatically generate a working streaming program (e.g., an OpenCL, DirectCompute, or CUDA program) from the control graph description and may provide additional features to test, document, and profile the resulting streaming program. In embodiments described herein, programs can be executed on a graphics processor, such as a single GPU, multiple GPUs, multicore CPUs, etc.

Systems and/or methods described herein may reduce effort required of programmers by automating tedious and repetitive software chores. For example, the systems and/or methods may allow a novice streaming programming language programmer to specify and construct a working program with significantly less time than would be required using conventional programming techniques. The systems and/or methods may allow a software architect to design at the pipeline level rather than being bogged down in the details of the streaming programming language constructs. Additionally, the systems and/or methods may allow an application developer to estimate throughput and performance of a design based on parameters The terms "component" and "device," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
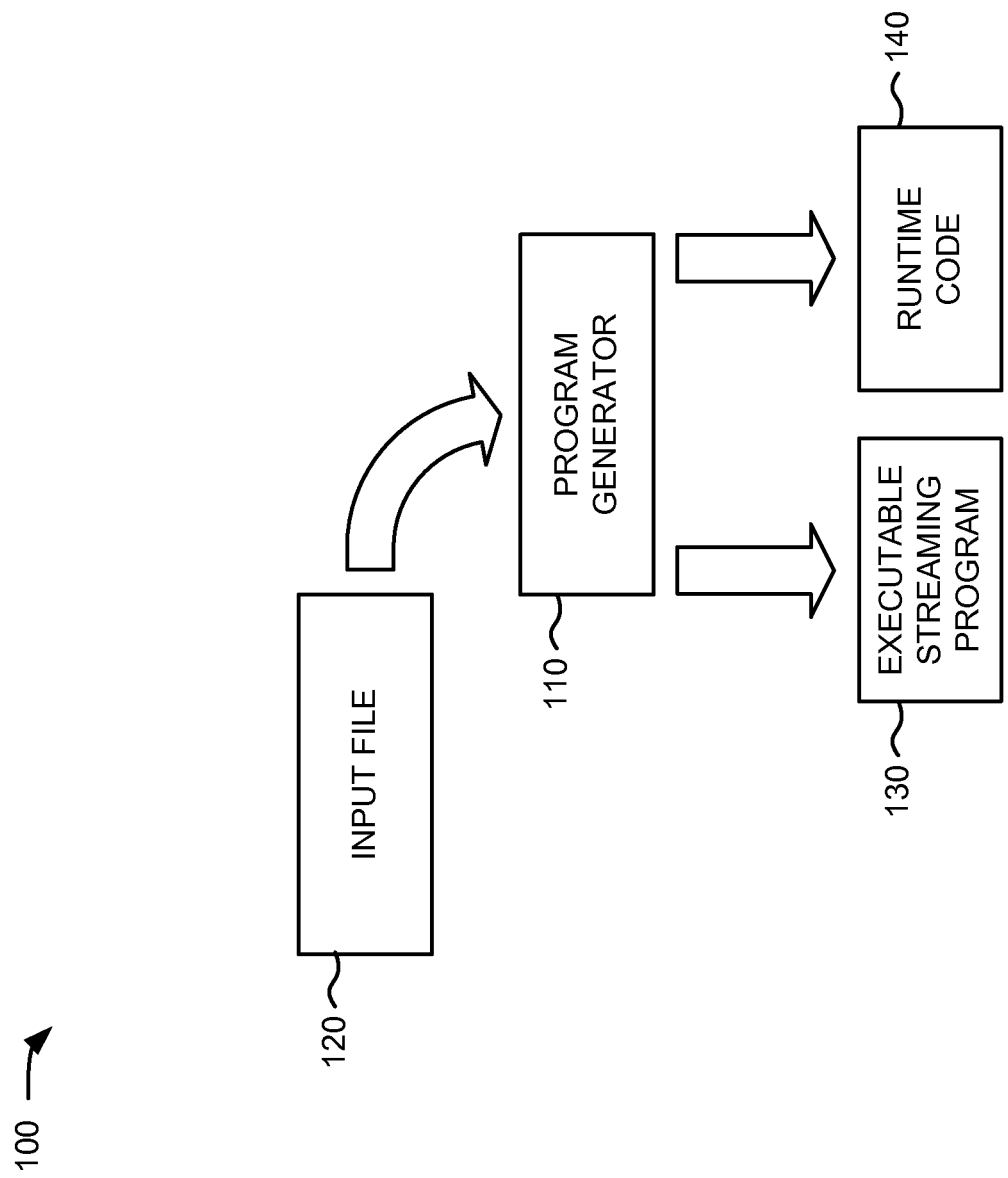
FIG. 1 is a diagram of an example system for generating a streaming program.

FIG. 1 is a diagram of an example system 100 for generating a streaming program. As shown in FIG. 1, system 100 may include a program generator 110 that receives input file 120 and may generate an executable streaming program 130 and runtime code 140.

Program generator 110 may include a compiler component to transform input file 120 to an alternative form. For example, program generator 110 may generate code (e.g., executable streaming program 130) that corresponds to a format (e.g., OpenCL, DirectCompute, CUDA, etc.) identified in high-level abstractions of input file 120. Program generator 110 may perform various operations to generate the code. For example, program generator 110 may prepare data structures, evaluate parameters, determine entity connectivity, determine signal compatibility, etc., associated with the high-level abstractions of input file 120. Given the expansive nature of existing compilers, it will be appreciated that this description is not intended to be construed as an exhaustive treatment of compilers, code generators, translators, and the like. Generally, compilers may convert or translate a source language to a target language. Thus, for purposes of discussion, program generator 110 may be described as a compiler that converts the high-level abstractions of input file 120 into an executable form, which may then be executed to evaluate a computational pipeline.

Input file 120 may include, for example, a pipeline specification in the form of a text file. In one embodiment, input file 120 may define components of a computational pipeline. For example, input file 120 may describe the relationships among buffers, kernels, uniforms and invariants of a streaming program. Control flow may be specified by one or more control graphs (or execution graphs) that consist of stages. Stages may typically invoke kernels, although some stages may execute on a host CPU, such as stages that make branching decisions. Input file 120 may also define code sections of a resulting executable streaming program.

Executable streaming program 130 may include, for example, an executable streaming program compiled based on input file 120. Executable streaming program 130 may use a streaming programming language identified in input file 120, such as OpenCL, DirectCompute, CUDA, or another selected streaming programming language. Executable streaming program 130 may include multiple control graphs from a single input file 120. The control graphs may execute on one or more graphics processors, and/or on graphics processors distributed across nodes of a Message Passing Interface (MPI) computing cluster.

Runtime code 140 may include, for example, code to execute executable streaming program 130 for efficiency, for unit testing, for debugging and/or for performance measurement and prediction. For example, the runtime code 140 may simulate the memory access patterns of the kernels, so that memory bandwidth requirements can be estimated based on input file 120.

Example Device Configuration

Figure 2:
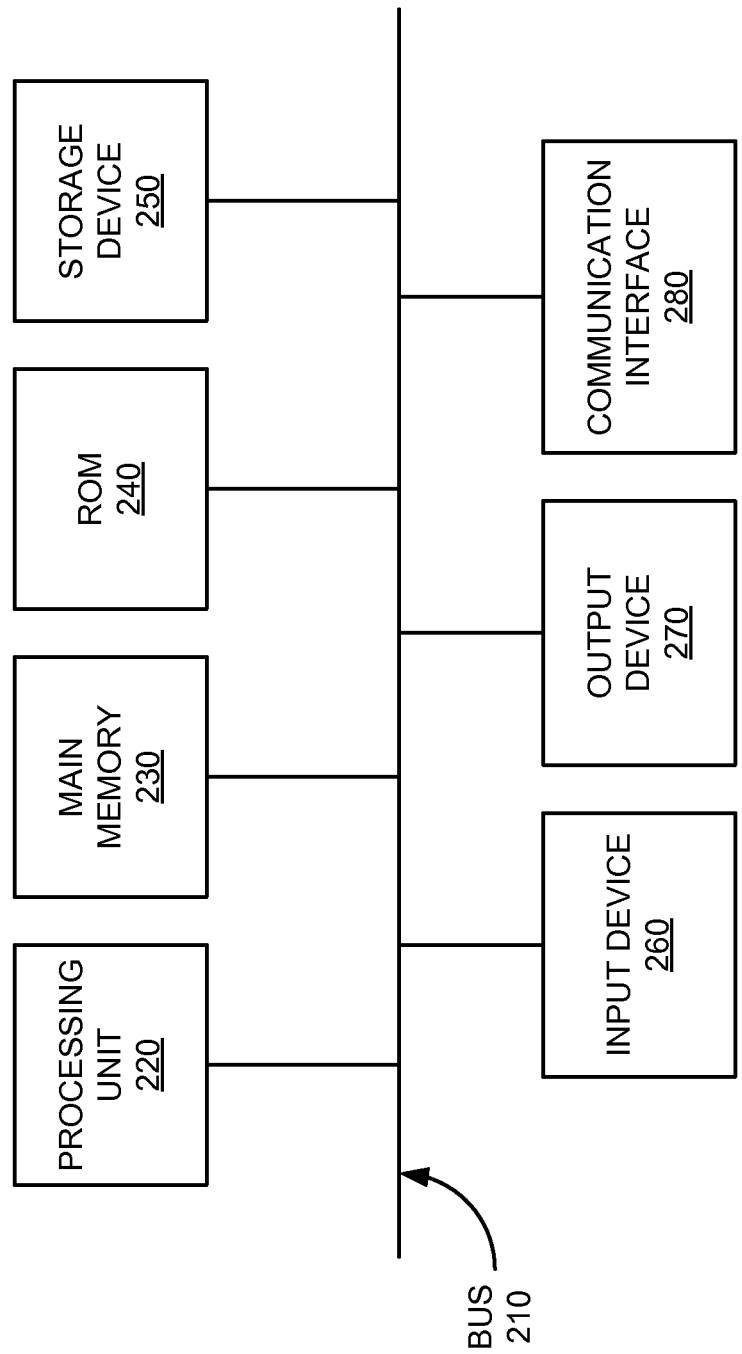
FIG. 2 is a diagram of example components of a device that may execute a streaming program according to embodiments described herein.

FIG. 2 is a diagram of example components of a device 200 that may generate a streaming program according to embodiments described herein. Device 200 may include any computation or communication device that utilizes one or more graphics processors. For example, device 200 may include a personal computer, a desktop computer, a laptop computer, a tablet computer, a personal communications system (PCS) terminal, a personal digital assistant (PDA), a smart phone, a set-top box, a content recording device (e.g., a camera, a video camera, digital video recorder (DVR), etc.), and/or other types computation or communication devices.

As illustrated in FIG. 2, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors (e.g., multi-core processors), microprocessors, or other types of processing units that may interpret and execute instructions. In one embodiment, processing unit 220 may include a single processor that includes multiple cores. Main memory 230 may include a RAM, a dynamic RAM (DRAM), and/or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows example components of device 200, in other embodiments, device 200 may include fewer components, different components, differently arranged components, or additional components than depicted in FIG. 2. Alternatively, or additionally, one or more components of device 200 may perform one or more other tasks described as being performed by one or more other components of device 200.

Example Input File Configuration

Figure 3:
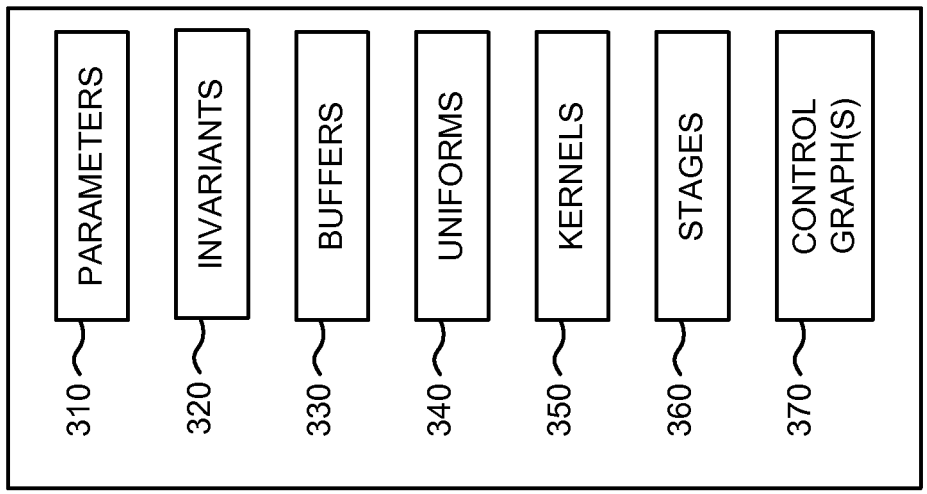
FIG. 3 is a diagram of example elements of an input file of FIG. 1.

FIG. 3 is a diagram of example elements of input file 120. In one embodiment, the elements depicted in FIG. 3 may form a text file. In another implementation, elements depicted in FIG. 3 may be received as user input via API calls. As shown, input file 120 may include parameters 310, invariant object 320, buffer objects 330, uniform objects 340, kernel objects 350, stage objects 360, and control graph object(s) 370. While elements of input file 120 are described primarily in the context of an OpenCL construct, in other embodiments, other streaming programming languages may be used.

Parameters 310 may include top-level attributes for the computational pipeline. Some top-level attributes may be defined to set defaults for kernel invocation and the program generator target (e.g., OpenCL, DirectCompute, CUDA, etc.). Generally, one pipeline declaration may be included per input file 120. Input file 120 may begin, for example, with "Pipeline<name>{<attributes>}". One of the attributes can be "target=<value>" where <value> is a supported streaming programming language, such as OpenCL or DirectCompute. Other attributes may include, for example, range and workgroup_size. After the top-level attributes, input file 120 may include a list of objects (e.g., invariant objects 320, buffer objects 330, uniform objects 340, kernel objects 350, stage objects 360, and control graph object(s) 370) that define the computational pipeline. Any top-level attributes that are defined in parameters 310 may be inherited by relevant objects. However, the top-level attributes may be overridden in a declaration for later objects.

Invariant objects 320 may support standard binary operators. Invariant object 320 types may include, for example, integers (e.g., <int>) and floating points (e.g., <float>). If an expression is provided for an invariant object 320, the equation can be true whenever the generated class invokes kernels. This makes it possible to preserve invariants at runtime that can be passed into a kernel (as a uniform object) or used to control kernel invocation (for example, by controlling the range). The generated class may contain accessor and mutator functions (e.g., of the form getX( ) and setX(y)) for each variable X named on the left hand side of an invariant object. The invariant equation can be respected so long as the application uses these mutator functions to change the values of the relevant variables. If no expression is provided then a variable may be reserved that may be used in other invariant objects. An example syntax for invariant object 320 may include:

<type> <id>=<expression>; |<type> <id>;

where <type> may include <int> or <float>; <id> may include an identifier for the invariant object; and <expression> may include an invariant equation.

Buffer objects 330 may describe a memory component that may receive information from and/or provide information to a kernel. In one embodiment, buffer object 330 may declare a buffer of a specified type, such as a primitive type in OpenCL or DirectCompute. An example syntax for buffer object 330 may include:

Buffer <id>("_global"|"_local", <type>, <size-expression>){<attributes>} where Buffer <id> may include an identifier for the buffer object; "_global"|"_local" may include alternative attribute declarations; <type> may include a primitive type in OpenCL or DirectCompute; and <size-expression> may include an expression of the buffer size.

Uniform objects 340 may declares scalar quantities that can be passed into kernels (e.g., kernel objects 350) as arguments. As with invariant objects 320, uniform object 340 types may include integers (e.g., <int>) and floating points (e.g., <float>). These quantities may exist as class members and may be directly accessed or modified. Unlike invariant objects 320, uniform objects 340 may not have a corresponding expression. An example syntax for invariant object 320 may include:

Uniform <type> <id>{<attributes>} where <type> may include <int> or <float>.

Kernel objects 350 may declare a kernel with a list of input parameters and output parameters. In one embodiment, a kernel declaration may be similar to a function prototype in the C++ programming language. The input and output parameters of kernel objects 350 may be matched with arguments provided in stage objects 360. An example syntax for kernel object 350 may include:

Kernel <id>: (<input-argument> . . . )–>(<output-argument> . . . ){<attributes>}where Kernel <id> may include an identifier for the kernel object; <input-argument> may define, for example, arguments for consuming buffers; and <output-argument> may define, for example, arguments for producing buffers.

Stage objects 360 may declare an invocation of a kernel as a stage of a control graph. In one embodiment, a stage object may be similar to a function invocation in the C++ programming language. Named arguments may be provided to the kernel and should agree in type with parameters declared for that kernel. In one implementation, stage objects 360 may include barriers and/or fences to synchronize multi-GPU processing. An example syntax for stage object 360 may include:

Stage <id>: <kernelId>(<id>, . . . )→(id, . . . ){<attributes>} where Stage <id> may include an identifier for the stage object; and kernelId may include an identifier for a kernel object.

Control graph object(s) 370 may define a control graph that determines a sequence in which stage objects 360 may execute. In one embodiment, multiple control graphs may be defined and selected at runtime. Each control graph may have a starting stage object 360 specified by the attribute "start." Control graph object 370 may be defined by a list of edges, where each edge may be defined by a pair of stages. That is, a stage object 360 pair may correspond to an edge in the control graph, while each stage object 360 may correspond to a vertex in the control graph. In one embodiment, control graph object 370 may contain cycles. Any stage object 360 that has multiple descendents may be defined as a branch selector stage (e.g., declaring the attribute "branchSelector"). An example syntax for control graph object 370 may include:

Graph <id>{<Stage>, <Stage>; . . . } {start=. . . ;} where Graph <id> may include an identifier for the stage object; and <Stage>, <Stage> may include a stage object pair.

Although FIG. 3 shows example elements of input file 120, in other embodiments, input file 120 may include fewer elements, different elements, differently arranged elements, or additional elements than depicted in FIG. 3. Alternatively, or additionally, one or more elements of input file 120 include assignments for one or more other tasks described as being assigned by one or more other elements of input file 120.

Alternatively the elements may be provided by making API calls rather than providing a textual input file.

Example Control Graph

Figure 4:
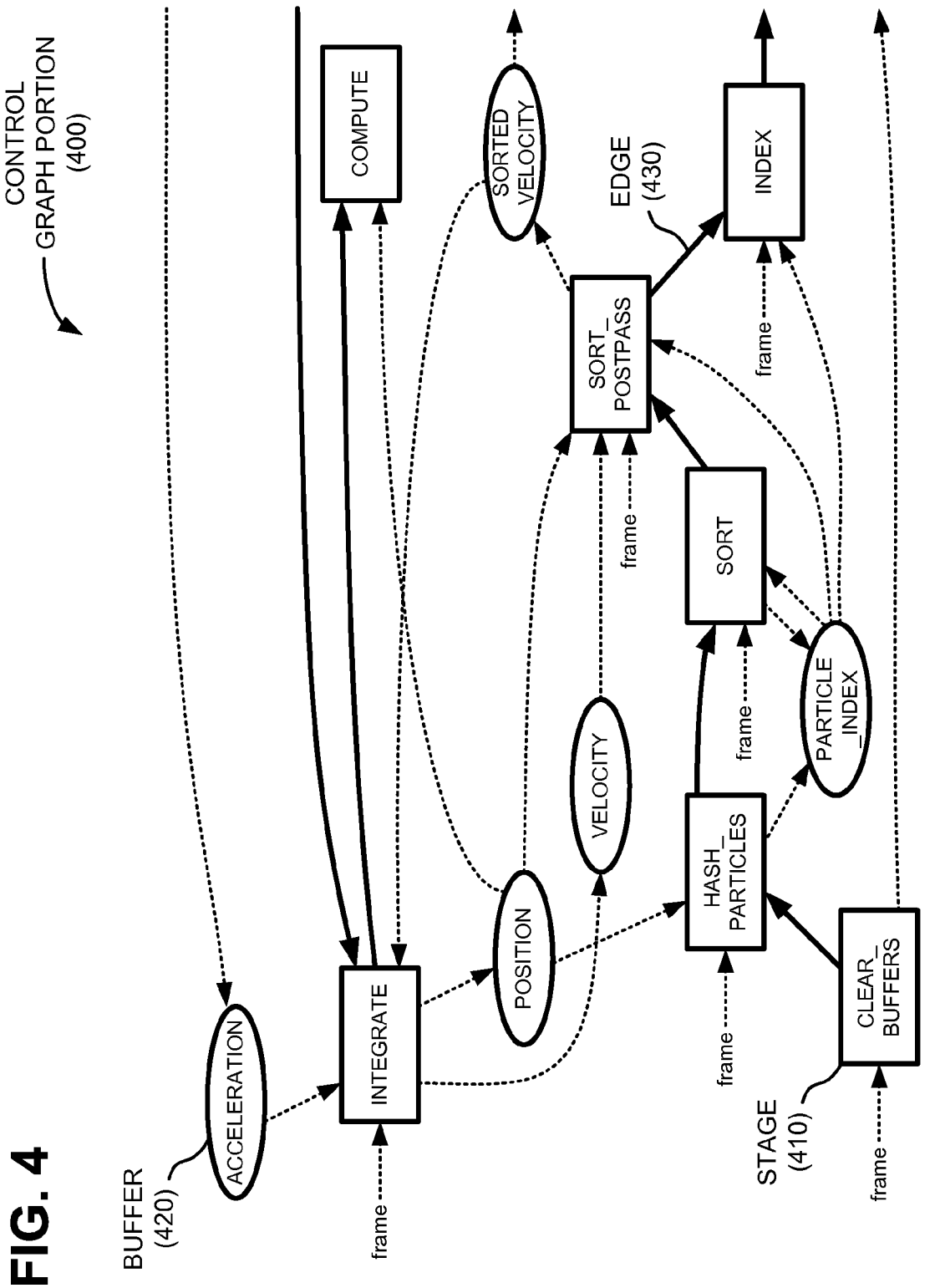
FIG. 4 is a diagram of an example portion of a control graph according to an embodiment described herein.

FIG. 4 is a diagram of an example portion 400 of a control graph. Control graph portion 400 may be defined, for example, by elements of input file 120 (FIG. 3). Control graph portion 400 may include multiple stages 410 (e.g., represented generally as boxes) and multiple buffers 420 (e.g., represented generally as ovals). Edges 430 may be defined by pairs of stages 420. In one embodiment, control graph portion 400 may provide a visual representation of a portion of a control graph defined in input file 120. In another embodiment, control graph portion 400 may be included as part of a graphical user interface tool that may be used to visualize, generate, and/or modify an input file (e.g., input file 120). Control graph portion 400 is shown in lieu of a complete control graph for simplicity.

Stages 410 may invoke a kernel (e.g., defined by one of kernel objects 350) for a particular graphics processor or one of multiple graphics processors. In some embodiments, stages 410 may alternatively invoke host-side CPU resources that do not invoke a kernel on a graphics processor. The kernels may produce (e.g., write to) and/or consume (e.g., read from) buffers 420. Terminology used within stages 410 and buffers 420 of FIG. 4 is for illustrative purposes. The terminology may relate to, for example, a smoothed particle hydrodynamics simulation. Thus, stages 410 may include representative kernel object names such as "clear_buffers," "hash_particles," "sort," "sort_postpass," "index," "integrate," and "compute."

As shown in FIG. 4, stages 410 may form a linear sequence, with each stage 410 being connected to a subsequent stage 410 via one of edges 430. Particularly, the linear sequence may start with "clear_buffers," followed by "hash_particles," "sort," "sort_postpass," and "index." After the "index" stage, other stages (not shown) may eventually lead to the "integrate" stage and the final "compute" stage. In other embodiments, control graph portion 400 may include a non-linear sequence of stages 410, including, for example, branches and/or loops.

A kernel executed at each stage 410 may write to and/or read from a buffer 420 to perform a task. Data flows to/from buffers 420 are indicated in control graph portion 400 via dotted lines. Arrows from buffers 420 leading into stages 410 may represent that stages 410 consume those buffers 420, and arrows leading out of stages 410 may represent that stages 410 produce those buffers 420.

In an embodiment herein, a user may arrange/re-arrange stages 410 by revising input file 120 (e.g., by changing the stage sequence in control graph object 370). In another embodiment, a user may employ a graphical user interface (e.g., presented on a display, such as output device 270) to arrange stages 410. Thus, a streaming programmer may design at the stage/pipeline level without being delayed in the details of the streaming programming language constructs.

Although FIG. 4 shows example elements control graph portion 400, in other embodiments, control graph portion 400 may include fewer objects, different objects, differently arranged objects, or additional objects than depicted in FIG. 4.

Figure 5:
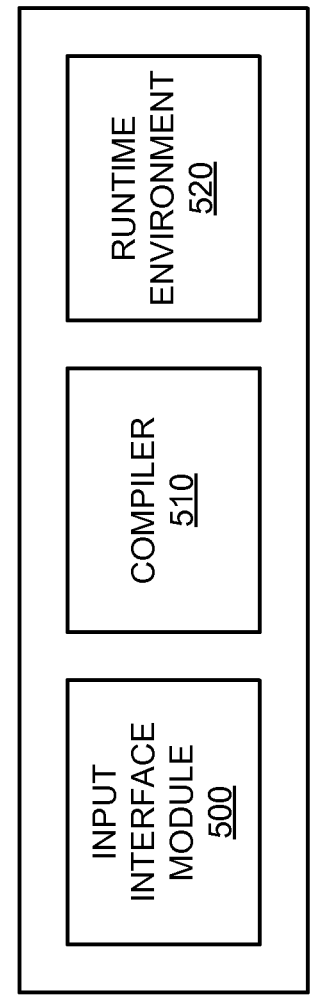
FIG. 5 is a diagram of example functional components of a program generator depicted in FIG. 1.

FIG. 5 is a diagram of example functional components of program generator 110. In one embodiment, the functions described in connection with FIG. 5 may be performed by one or more components of device 200 (FIG. 2). As shown in FIG. 5, program generator 110 may include an input interface module 500, a compiler 510, and a runtime environment 520.

Input interface module 500 may include hardware or a combination of hardware and software that may collect user input to define elements of a computational pipeline. For example, input interface module 500 may provide a menu-driven interface to solicit definitions of buffers, kernels, and stages. In one embodiment, input interface module 500 may instruct a user to provide an input that includes optional code sections, invariants, buffers, uniforms, kernels, stages and control graphs, in that order. In another embodiment, input interface module 500 may take the form of one or more templates. In still another embodiment, input interface module 500 may include a graphical user interface that allows a user to define, for example, invariants, buffers, uniforms, kernels, and stages. The graphical user interface may visually present the invariants, buffers, uniforms, kernels, and/or stages within a control graph (e.g., similar to control graph portion 400) that may be arranged and/or modified by a user at a high level of abstraction (e.g., via buffers, kernels, stages, etc.). Input interface module 500 may collect/assemble the user input into a file (e.g., input file 120) with a format (e.g., a pipeline description language) that may be converted by program generator 110 into a streaming programming language.

Compiler 510 may include hardware or a combination of hardware and software that may perform a source-to-source translation from a pipeline description language of input file 120 to a C-based programming language. For example, compiler 510 may read input file 120 and generate a pipeline class (e.g., OpenCL, DirectCompute, etc.) in a C++ file with a .hpp extension.

Runtime environment 520 may include hardware or a combination of hardware and software that may generate and execute runtime code. For example, runtime environment 520 may also generate a file of external pipeline stages (e.g., a C++ source code file with a .ext.cpp extension) and a unit test framework (e.g., a C++ source code file with a .test.cpp extension). In an embodiment, the runtime code can execute the streaming program for high efficiency, for unit testing, for debugging, and for performance measurement and prediction. For example, runtime environment 520 may produce code that simulates the memory access patterns of the kernels, so that memory bandwidth requirements can be estimated from the description of the pipeline. In another embodiment, memory access patterns of the kernels may be combined with feedback from, for example, an integrated runtime profiler (e.g., that gathers performance data from the GPU as the streaming program application executes) to build a model of program performance at different problem scales. The runtime code may be executed when frames are served (e.g., for each stage of a control graph). The runtime code may be executed on every frame requested and only for that specific frame, in an event-driven fashion.

Although FIG. 5 shows example functional components of program generator 110, in other embodiments, program generator 110 may include fewer functional components, different functional components, differently arranged functional components, or additional functional components than depicted in FIG. 5. Alternatively, or additionally, one or more functional components of program generator 110 may perform one or more other tasks described as being performed by one or more other functional components of program generator 110.

Example Streaming Programming Generator Operations

FIG. 6 is a flow chart of an example process 600 for automatically generating a streaming program according to an embodiment described herein. In one embodiment, process 600 may be performed by device 200 (FIG. 2). In another embodiment, some or all of process 600 may be performed by one or more components of device 200, such as by program generator 110.

As illustrated in FIG. 6, process 600 may include providing a user interface to receive, from a user, input such as definitions for buffers, kernels, and stages within a control graph (block 610), and generating an input file based on the user input (block 620). For example, in embodiments described above in connection with FIG. 5, program generator 110 (e.g., input interface module 500) may provide a menu-driven interface to solicit definitions of buffers, kernels, and stages. In one embodiment, input interface module 500 may instruct a user to provide an input that includes optional code sections, invariants, buffers, uniforms, kernels, stages and control graphs, in that order. In another embodiment, input interface module 500 may take the form of one or more templates. In still another embodiment, input interface module 500 may include a graphical user interface that allows a user to define, for example, invariants, buffers, uniforms, kernels, and stages. The graphical user interface may visually present the invariants, buffers, uniforms, kernels, and/or stages within a control graph (e.g., similar to control graph portion 400) that may be arranged and/or modified by a user at a high level of abstraction (e.g., via buffers, kernels, stages, etc.). Input interface module 500 may collect/assemble the user input into a file (e.g., input file 120) with a format (e.g., a pipeline description language) that may be converted by program generator 110 into a streaming programming language.

As further shown in FIG. 6, process 600 may include generating, based on the input file, kernel signatures for a graphics processor, where kernel signatures compile into an executable streaming program for the computational pipeline (block 630). For example, in embodiments described above in connection with FIG. 5, program generator 110 (e.g., compiler 510) may read input file 120 and generate kernel signatures in an OpenCL programming language file.

Returning to FIG. 6, process 600 may include generating, based on the input file, host-side runtime code to execute the streaming program (block 640). For example, in embodiments described above in connection with FIG. 5, runtime environment 520 may generate a pipeline class (e.g., a C++ file with an .hpp extension), a file of external pipeline stages (e.g., a C++ source code file with a .ext.cpp extension), and a unit test framework (e.g., a C++ source code file with a .test.cpp extension). In an embodiment, the runtime code can execute the streaming program for high efficiency, for unit testing, for debugging, and for performance measurement and prediction. For example, runtime environment 520 may produce code that simulates the memory access patterns of the kernels, so that memory bandwidth requirements can be estimated from the description of the pipeline. In another embodiment, memory access patterns of the kernels may be combined with feedback from, for example, an integrated runtime profiler (e.g., that gathers performance data from the graphics processor as the streaming program application runs) to build a model of program performance at different problem scales.

Systems and/or methods described herein may receive an input file that includes definitions of components of a computational pipeline, where the components include one or more buffers, one or more kernels, and one or more stages within a control graph. The systems and/or methods may generate, based on the input file, kernel signatures for a graphics processor, where the kernel signatures compile into an executable streaming program for the computational pipeline, and may generate, based on the input file, host-side runtime code to execute the streaming program.

The foregoing description of embodiments provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 6, the order of the blocks may be modified in other embodiments. Further, non-dependent blocks may be performed in parallel. In another example, the number of different applications and threads, described herein, were provided for explanatory purposes only.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain embodiments described herein may be implemented as a "component" or as "logic" that performs one or more functions. This component or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim 1n combination with every other claim 1n the claim set.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
receiving, by the computing device, input that defines components of a computational pipeline,
the components including one or more buffers, one or more kernels, and one or more stages within a control graph, and
the input further defining that a particular stage, of the one or more stages, invokes a particular kernel of the one or more kernels;
generating, by the computing device and based on the input, kernel signatures for a graphics processor,
the kernel signatures compiling into an executable streaming program for the computational pipeline; and
generating, by the computing device and based on the input, host-side runtime code to execute the executable streaming program,
the host-side runtime code including a unit test framework that executes the executable streaming program to simulate memory access patterns of the one or more kernels.

2. The computing device-implemented method of claim 1, where the input is:
one or more application programming interface calls, or
a text file supplied by a user.

3. The computing device-implemented method of claim 1, further comprising:
providing a graphical user interface to receive, from the user, definitions for the one or more buffers, the one or more kernels, and the one or more stages within the control graph; and
generating, based on the definitions, the input.

4. The computing device-implemented method of claim 1, where the executable streaming program is one of:
an OpenCL program,
a DirectCompute program, or
a CUDA program.

5. The computing device-implemented method of claim 1, where the host-side runtime code further includes a file of external pipeline stages.

6. A device comprising:
a memory storing a plurality of instructions; and
a processor to execute the plurality of instructions in the memory to:
receive user input that includes definitions of components of a computational pipeline,
the components including multiple buffers, multiple kernels, and multiple stages within a control graph, and
the input further defining that a particular stage, of the multiple stages, invokes a particular kernel of the multiple kernels;
generate, based on the user input, kernel signatures for a graphics processor,
the kernel signatures compiling into an executable streaming program for the computational pipeline; and
generate, based on the user input, host-side runtime code to execute the executable streaming program,
the host-side runtime code including a unit test framework that executes the executable streaming program to simulate memory access patterns of the multiple kernels.

7. The device of claim 6, where the processor is further to:
provide an application programming interface to request, from a user, the definitions of the components.

8. The device of claim 7, where the application programming interface includes:
a menu-based interface, or
a graphical user interface.

9. The device of claim 6, where the executable streaming program includes a C-based programming language program.

10. The device of claim 6, where the host-side runtime code further includes a file of external pipeline stages.

11. The device of claim 6, where the device includes a computation or communication device that utilizes the graphics processing unit.

12. The device of claim 6, where the device includes a computation or communication device that utilizes multi-core processors.

13. The device of claim 6, where the graphics processor is provided on another device separate from the device.

14. A non-transitory computer-readable medium storing instructions, the instructions comprising:
one or more instructions that, when executed by at least one processor, cause the at least processor to:
receive input that includes definitions of components of a computational pipeline,
the components including one or more buffers, one or more kernels, and one or more stages within a control graph, and
the input further defining that a particular stage, of the one or more stages, invokes a particular kernel of the one or more kernels;
generate, based on the input, kernel signatures for a graphics processor,
the kernel signatures compiling into an executable streaming program for the computational pipeline; and
generate, based on the input, host-side runtime code to execute the executable streaming program,
the host-side runtime code including a unit test framework that executes the executable streaming program to simulate memory access patterns of the one or more kernels.

15. The non-transitory computer-readable medium of claim 14, further comprising:
one or more instructions to present an application programming interface to receive definitions of the components.

16. The non-transitory computer-readable medium of claim 15, where the application programming interface includes a graphical user interface for representing the one or more buffers and the one or more stages.

17. The non-transitory computer-readable medium of claim 14, where the executable streaming program is one of:
an OpenCL program,
a DirectCompute program, or
a CUDA program.

18. The non-transitory computer-readable medium of claim 14, where the particular kernel produces or consumes a particular buffer of the one or more buffers.

19. The non-transitory computer-readable medium of claim 14, where the control graph specifies a sequence in which the one or more stages execute.

20. The method of claim 1, where the input further defines that the particular kernel is associated with a particular buffer of the one or more buffers.

* * * * *